(12) United States Patent
Liu et al.

(10) Patent No.: US 10,137,398 B2
(45) Date of Patent: Nov. 27, 2018

(54) APPARATUS AND METHOD FOR TREATMENT OF EXHAUST GAS

(71) Applicant: KEPPEL OFFSHORE & MARINE TECHNOLOGY CENTRE PTE LTD, Singapore (SG)

(72) Inventors: Ming Liu, Singapore (SG); Nirmal Raman Gurunthalingam, Singapore (SG); Kok Seng Foo, Singapore (SG); John David Young, Edinburgh (GB)

(73) Assignee: Keppel Offshore & Marine Technology Centre Pte Ltd, Singapore (SG)

( * ) Notice: Subject to any disclaimer, the term of this patent is extended or adjusted under 35 U.S.C. 154(b) by 132 days.

(21) Appl. No.: 15/513,576

(22) PCT Filed: Sep. 30, 2015

(86) PCT No.: PCT/SG2015/050356
§ 371 (c)(1),
(2) Date: Mar. 23, 2017

(87) PCT Pub. No.: WO2016/053190
PCT Pub. Date: Apr. 7, 2016

(65) Prior Publication Data
US 2017/0282111 A1    Oct. 5, 2017

Related U.S. Application Data

(60) Provisional application No. 62/057,704, filed on Sep. 30, 2014.

(51) Int. Cl.
*B01D 47/06* (2006.01)
*B01D 47/10* (2006.01)
(Continued)

(52) U.S. Cl.
CPC ........... *B01D 47/10* (2013.01); *B01D 47/025* (2013.01); *B01D 47/06* (2013.01);
(Continued)

(58) Field of Classification Search
CPC ........ B01D 2247/105; B01D 2247/107; B01D 47/02; B01D 47/06; B01D 47/10; B01D 53/1456; B01D 53/1487
See application file for complete search history.

(56) References Cited

FOREIGN PATENT DOCUMENTS

| CN | 2383576 Y | 6/2000 |
|---|---|---|
| CN | 201783300 U | 4/2011 |

(Continued)

OTHER PUBLICATIONS

PCT Patent Application PCT/SG2015/050356 International Search Report and Written Opinion dated Jan. 13, 2016.

*Primary Examiner* — Cabrena Holecek
(74) *Attorney, Agent, or Firm* — Erise IP, P.A.

(57) ABSTRACT

The present disclosure relates to an apparatus and method of removing pollutants from exhaust gas by wet scrubbing process. In a scrubber apparatus of the present disclosure, an exhaust gas is first scrubbed in a primary mixing zone, the partially scrubbed gas discharged from the primary mixing zone is subsequently mixed forcibly in a secondary mixing zone before being discharged for polishing, demisting and/or reheating.

11 Claims, 6 Drawing Sheets

(51) Int. Cl.
*B01D 53/14* (2006.01)
*B01D 47/02* (2006.01)

(52) U.S. Cl.
CPC ..... *B01D 53/1456* (2013.01); *B01D 53/1487* (2013.01); *B01D 2247/105* (2013.01); *B01D 2247/107* (2013.01)

(56) References Cited

FOREIGN PATENT DOCUMENTS

| | | |
|---|---|---|
| CN | 203764062 U | 8/2014 |
| CN | 104028068 A | 9/2014 |
| KR | 10-1166484 B1 | 7/2012 |
| KR | 101166484 B1 * | 7/2012 |

* cited by examiner

APPARATUS AND METHOD FOR TREATMENT OF EXHAUST GAS

RELATED APPLICATIONS

The present application is a national stage application under 35 U.S.C. § 371 of International Application No. PCT/SG2015/050356, filed 30 Sep. 2015, which claims priority to U.S. Provisional Application No. 62/057,704, filed 30 Sep. 2014. The above-referenced applications are hereby incorporated by reference into the present application in their entirety.

RELATED APPLICATIONS

The present application is a national stage application under 35 U.S.C. § 371 of International Application No. PCT/SG2015/050356, filed 30 Sep. 2015, which claims priority to U.S. Provisional Application No. 62/057,704, filed 30 Sep. 2014. The above-referenced applications are hereby incorporated by reference into the present application in their entirety.

TECHNICAL FIELD

The present disclosure relates to a wet scrubbing apparatus for treating exhaust gas which may be discharged from marine engine, boiler and incinerator, and particularly for scrubbing water soluble pollutant gases such as sulphur oxides ($SO_x$), particulate matter (PM) and unburned hydrocarbons from the exhaust gas.

BACKGROUND

In order to comply with International Maritime Organisation (IMO) gas emission regulations to be implemented in ECAs (Emission Control Areas), several technologies have been developed to remove the harmful pollutants from exhaust gas as a result of combusting fossil fuel in marine engines, boilers and incinerators.

Information relating to existing apparatus and methods for treating exhaust gas can be found in the following publications:

U.S. Pat. No. 3,793,809 (Tomany et al.) discloses a venturi type scrubber for fine particles removal in which gaseous stream is fed co-currently with liquid spray from a top centre feed venturi throat, and further removal is enhanced by reversing the gas flow and force it through a loosely packed packing sections. At the final stage, a plurality of vane type passage is provided to remove any entrained liquid mists.

U.S. Pat. No. 5,759,233 (Schwab) discloses a vertically positioned venturi throat concept where the particle laden gas is introduced through the bottom opening of the means so that the gas and liquid spray are flowing upward towards the exit of the means, facilitating connection to an exhaust gas fan. It is highlighted that the liquid flow is controlled in order not to affect the droplet size.

U.S. Pat. No. 6,036,756 (Gohara et al.) discloses a top centre feed type scrubber where the effectiveness is enhanced by the perforated section located at the bottom of a run-down pipe, where the pollutant laden gas reverses and enters the absorption zone included in the annulus space between run-down pipe and the scrubber external shell.

Currently, proper design for shipboard installation is relatively few when retrofitting, footprint, weight, back pressure and performance under motion are considered.

Accordingly, improved apparatus and method for treating exhaust gas to remove water soluble pollutants such as sulphur oxides ($SO_x$), particulate matter (PM) and unburned hydrocarbons are highly desirable.

SUMMARY

According to one aspect of the invention, a scrubber apparatus is provided. The scrubber apparatus comprises:
a venturi section to receive an exhaust gas;
at least a primary spray header to inject a primary wash liquid into the venturi section;
a downcomer disposed downstream of the venturi section and fluidly coupled to the constriction of the venturi;
a primary collection tank disposed downstream of the downcomer to retain the primary wash liquid and a partially scrubbed gas discharged from the downcomer;
a plurality of secondary mixing throats arranged at an inclination to the vertical direction, each of the secondary mixing throats is provided with a secondary spray header adapted to inject into the each secondary mixing throat a high pressure secondary wash liquid which is to cause the partially scrubbed gas to be drawn into the each secondary mixing throat to mix with the secondary wash liquid, wherein the resulting gas is to be discharged from the each secondary mixing throat as a vortical gas flow which is to be fed into a polishing section having a plurality of polishing spray headers to polish the vortical gas flow; and
a demister disposed to remove entrained wash liquid mist from a polished gas discharged from the polishing section.

In certain embodiments, the downcomer includes a tapered conduit having a narrow end and a distal wide end, the narrow end being fluidly coupled to the exit of the downcomer, and a packing section fluidly coupled to the wide end of the tapered conduit, wherein the partially scrubbed gas to be discharged from the downcomer is to pass through the conduit and the packing section.

In certain embodiments, the downcomer includes a packing section fluidly coupled thereto, wherein the partially scrubbed gas to be discharged from the downcomer is to pass through the packing section.

In certain embodiments, the secondary mixing throats are mounted on a distribution plate which is disposed to separate the polishing section from the primary collection tank.

In certain embodiments, the scrubber apparatus further comprises a secondary collection tank disposed to receive liquid discharged from the polishing section.

According to another aspect of the invention, a method of scrubbing exhaust gas is provided. The method comprises:
passing an exhaust gas into a venturi section;
mixing a primary wash liquid with the exhaust gas in the venturi section and in a downcomer which is fluidly coupled thereto;
discharging a partially scrubbed gas from the downcomer into a primary collection tank;
creating a vortical gas flow from the partially scrubbed gas by injecting a high pressure secondary wash liquid through a plurality of secondary mixing throats, which are arranged at an inclination to the vertical direction, to forcibly draw the partially scrubbed gas from the primary collection tank into a polishing section;
polishing the vortical gas flow to remove remaining pollutants therefrom; and
removing entrained wash liquid mist from the polished gas.

In certain embodiments of the method, discharging a partially scrubbed gas from the downcomer into a primary collection tank further includes passing the partially scrubbed gas through a tapered conduit and a packing section.

In certain embodiments of the method, discharging a partially scrubbed gas from the downcomer into a primary collection tank further includes passing the partially scrubbed gas through a packing section.

In certain embodiments, the method further comprises:
receiving into a secondary collection tank a discharged liquid resulting from polishing the vortical gas flow;
increasing a pH of the discharged liquid collected in the secondary collection tank; and
transferring the pH-increased liquid to be injected through the each secondary mixing throat.

BRIEF DESCRIPTION OF THE DRAWINGS

Embodiments of the invention are disclosed hereinafter with reference to the drawings, in which.

DETAILED DESCRIPTION

Figure 1:
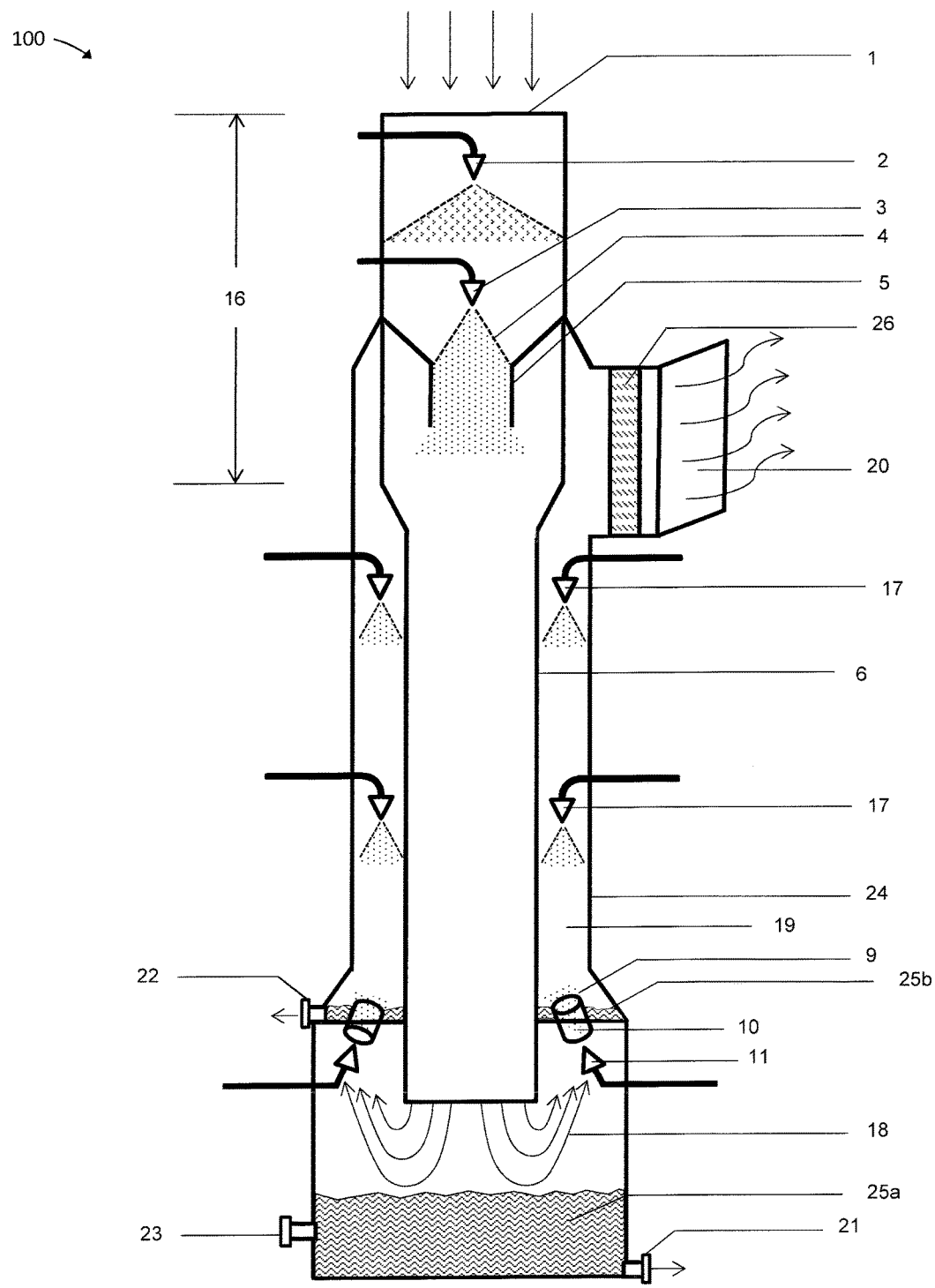
FIG. 1 is a schematic diagram of a multi-stage scrubber apparatus according to one embodiment of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference numerals refer to same or similar functionalities or features throughout the several views.

The present disclosure relates to an apparatus and method of removing pollutants from exhaust gas by turbulent eduction and forced mixing technology. To this purpose, a scrubber apparatus and method are provided for appropriate mixing of the injected wash liquid streams with exhaust gas in primary and secondary mixing zones to remove the water soluble pollutants such as sulphur oxides ($SO_x$).

As will be apparent from the following description, the scrubber apparatus of the present disclosure provides large interaction surface area, adequate retention time and turbulence to improve the absorption of exhaust gas into wash liquid with minimal pressure loss. In a scrubber apparatus of the present disclosure, an exhaust gas is first scrubbed in a primary mixing zone, the partially scrubbed gas discharged from the primary mixing zone is forcibly mixed in a secondary mixing zone before being discharged for polishing, demisting and/or re-heating.

FIG. 1 is a schematic diagram of a multi-stage scrubber apparatus 100 which is provided as a vertically oriented unit. The scrubber apparatus comprises a quenching and venturi section 16 (to provide a primary mixing zone 5), a downcomer section 8, a secondary mixing zone 12, a polishing stage, and a demister 26.

Figure 2:
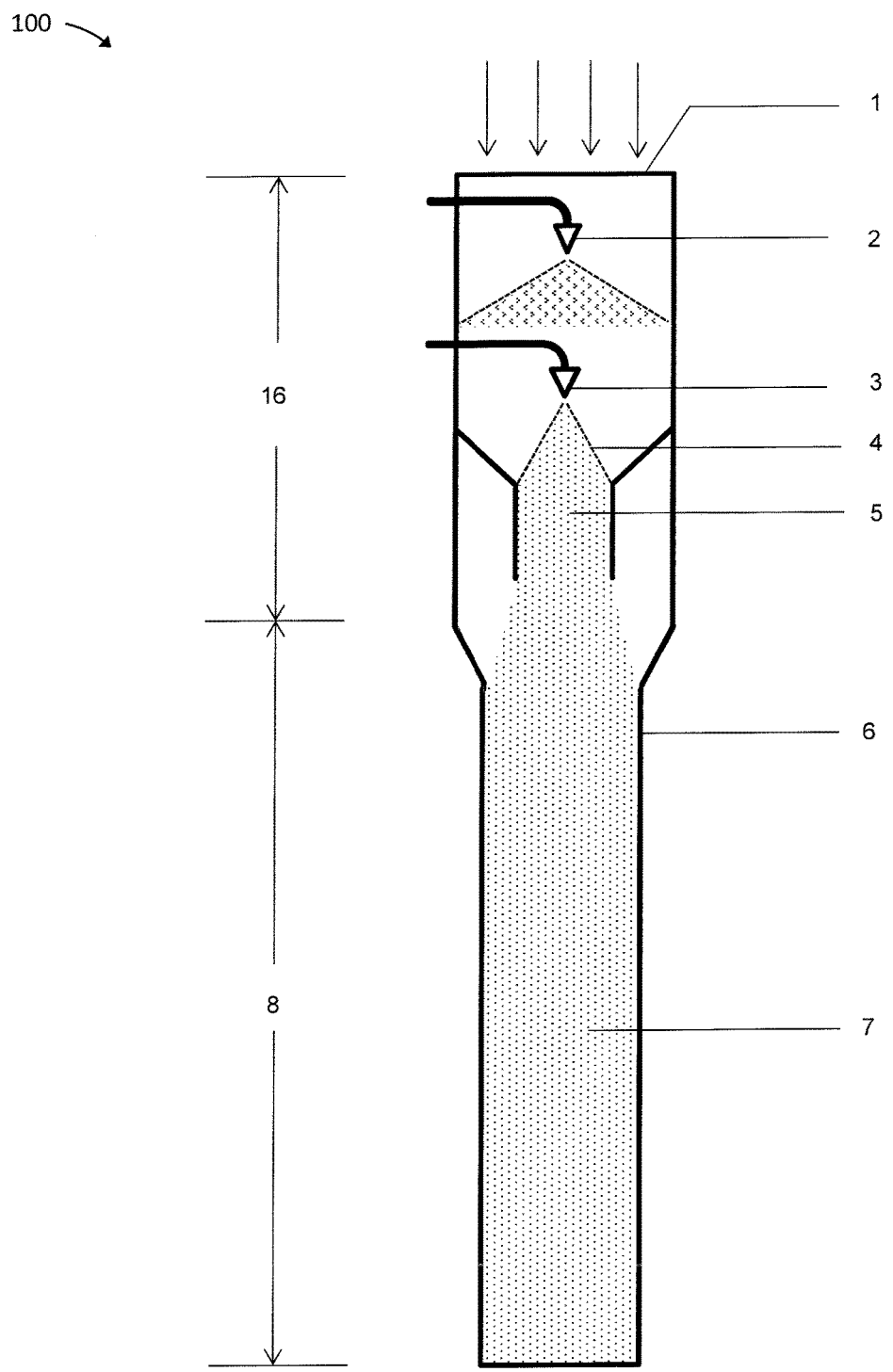
FIG. 2 illustrates a venturi stage and the downcomer of the scrubbing apparatus of FIG. 1.

FIG. 2 illustrates a venturi section 16 of the scrubber apparatus 100. An inlet 1 is provided to feed an incoming exhaust gas downwardly into the scrubber apparatus 100. The incoming gas is normally at a high temperature, e.g. 350 degree Celsius. At least a first primary spray header 2 is disposed proximate to the inlet 1 and is arranged to inject high pressure wash liquid in the same direction as the gas flows, i.e. downwardly, to cool the incoming exhaust gas. At least a second primary spray header 3 is disposed downstream of the first primary spray header 2 and is arranged to inject high pressure primary wash liquid 4 into a converging inlet within the venturi section 16. The converging inlet leads to a throat or constriction of the venturi section 16, which provides a primary mixing zone 5 for mixing the gas with the high pressure primary wash liquid. The constriction of the venturi leads to a downwardly-extending pipe or downcomer 6 which provides a turbulent misting region 7 where the gas and wash liquid are allowed to interact further, and the wash liquid is allowed to flow downwards.

The venturi section 16 may be centrally mounted in an axial direction of the downcomer 6 (see FIGS. 1 and 2). The constriction of the venturi section 16 has a reduced diameter relative to the diameter of the scrubber inlet 1 so that the velocity of gas entering the constriction increases. This increase in gas velocity produces a highly turbulent (high Reynolds number) flow pattern which results in creation of a "turbulent misting region" 7 in the downcomer 6. In the turbulent misting region 7, downward-flowing gas is mixed with mists of wash liquid which is generated inside the downcomer 6 due to the high pressure spray. One advantage of the turbulent misting region 7 is that it provides excellent mass and heat transfer between gas and liquids. This way, when the gas is discharged from the downcomer 6, the gas would be cooled to the adiabatic saturation temperature, e.g. around 50~60 degree Celsius.

Also, the gas would have been partially scrubbed and removed of a significant portion of $SO_x$ and the particulate matter therein. The downcomer 6 is suitably dimensioned to allow sufficient contact time for the gas to mix with the wash liquid to enhance the mixing thereof.

The wash liquid discharged from the above-described first scrubbing stage is received in a primary collection sump or tank 25a disposed downstream or at the base of the downcomer 6 (see FIG. 1). A primary drain line 21 is provided to drain water collected in the collection tank 25a. The primary collection tank 25a is disposed to retain the primary wash liquid and partially scrubbed gas discharged from the downcomer for further processing. Particularly, a distribution plate assembly (9, 11 and 13) is disposed in a space between the inner annulus and outer annulus of the scrubber apparatus 100, i.e. in an annular conduit 19 between the external wall of the downcomer 6 and an inner wall 24 of the scrubber apparatus housing (see FIGS. 1 and 3). The distribution plate assembly (9, 11 and 13) is further disposed to separate the polishing section 17 from the primary collection tank 25a or form an enclosure with the primary collection tank 25a, so that the partially scrubbed gas discharged from the downcomer 6 is forced to pass through the distribution plate assembly (9, 11 and 13) and caused to reverse its flow direction, i.e. from a downward to an upward direction 18.

Figure 3:
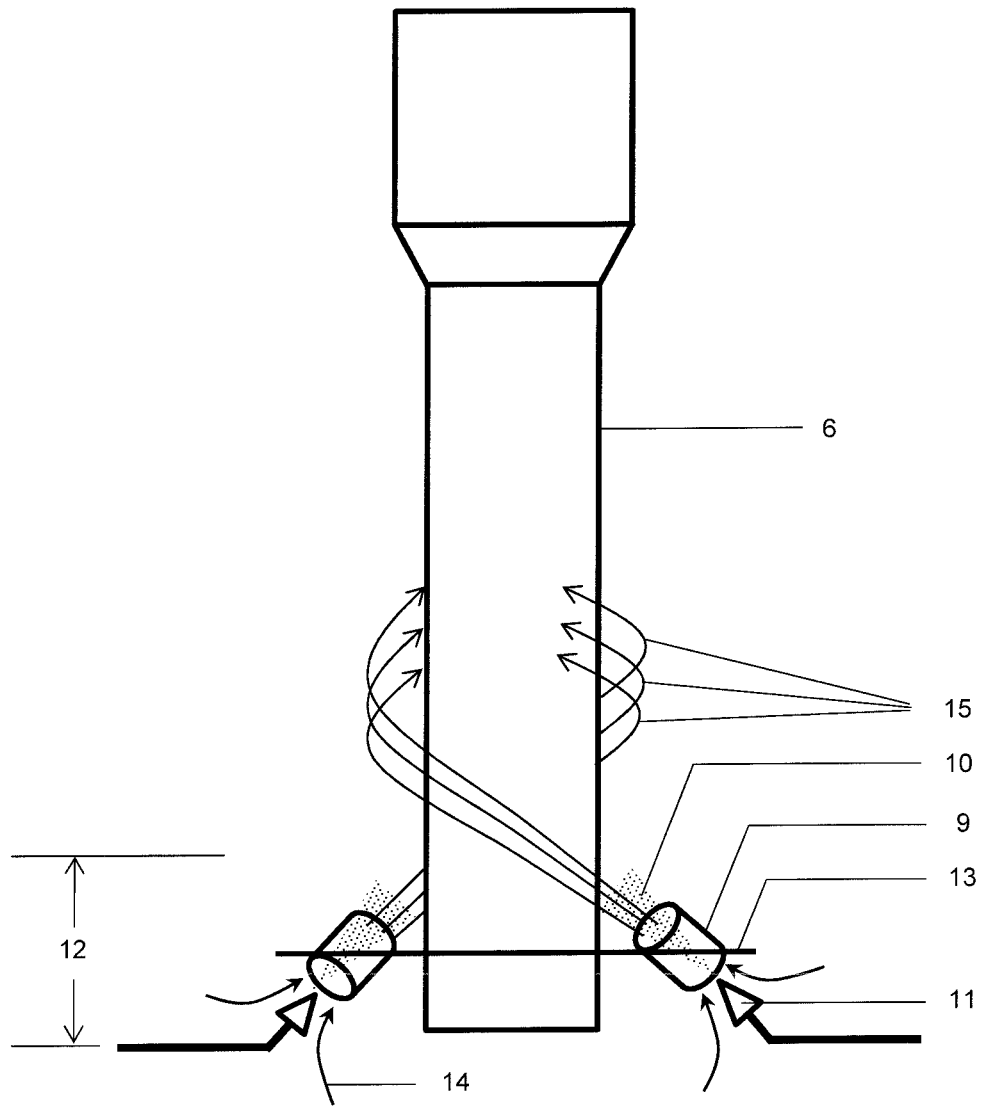
FIG. 3 illustrates a distribution plate assembly of the scrubbing apparatus of FIG. 1.

Reference is made to FIG. 3 which illustrates a distribution plate assembly (9, 11 and 13) having a distribution plate 13 and a plurality of secondary mixing throats 9 mounted therein to allow fluid communication from one side of the distribution plate 13 to the other (opposite) side. The number of secondary mixing throats 9 shall be adequate to allow an even distribution of the partially scrubbed gas to enter the annular conduit 19. In one embodiment, the distribution plate assembly has eight (8) secondary mixing throats 9. The secondary mixing throats 9 are disposed at an inclination or angle relative to the distribution plate 13. This angle may range between 0° to 90° degrees from a vertical or axial direction of the downcomer 6. In the illustrated embodiment, the secondary mixing throats are inclined at an angle of 60° relative to the distribution plate 13 or 30° relative to the vertical direction. The mixing throats 9 may take different configurations including, but not limited to, a hollow cylinder, a hollow tapered conduit or a venturi tube.

A plurality of secondary spray headers 11 are provided in the secondary mixing throats 9 of the distribution plate assembly (9, 11 and 13). The secondary spray header 11 is suitably disposed to inject a high pressure secondary wash liquid into the secondary mixing throat 9. The secondary spray header 11 may be disposed at one end (entry) of the secondary mixing throat 9. The entry end of the secondary mixing throat 9 is in fluid communication with the partially scrubbed gas 14 discharged from the downcomer 6. Injection of high pressure secondary wash liquid from the secondary spray header 11 into the secondary mixing throat 9 creates a pulling effect which draws the partially scrubbed gas 14 into the secondary mixing throat 9. This creates a forced turbulence mixing effect in the secondary mixing throat 9 which enhances contact between the gas and wash liquid thereby resulting in a high degree of mixing in the secondary mixing throat 9. This also creates a mist region 10 at the exit of the secondary mixing throat 9 and reduces pressure loss in the system. The result from the foregoing includes the creation in the secondary mixing throat 9 of a turbulence region 12 of gas and water which enhances gas interaction with wash liquid. The result from the foregoing also includes the creation of spinning vortexes of gas flow 15 at the exits of the mixing throats 9 due to the arrangement of inclined mixing throats (see FIG. 3) which forces gas flow to be discharged from each secondary mixing throat 9 at an angle to the vertical direction (see FIG. 3). The vortical flow pattern 15 of the gas is then fed into the annular conduit 19 (i.e. polishing section) for polishing. The secondary mixing throat opening may have any geometrical shape, preferably circular to enable the discharged gas flow in a vortical manner.

Reference is now made to FIG. 1 which illustrates the annular conduit 19 (i.e. polishing section) where polishing stage takes place. In the annular conduit 19, a plurality of polishing spray headers 17 are provided to remove remaining water soluble pollutants in the gas discharged from the secondary mixing zone 12. The polishing stage may be provided with two stages of high pressure spray headers, i.e. secondary and tertiary, which may be arranged to inject wash liquid which is co-current or counter current flow relative to the direction of the gas flow. This high pressure water spray helps to remove the final traces of pollutants in the gas. This water spray also cools the outer walls of the downcomer 6 thereby cooling the gas passing through the downcomer 6. In the polishing section, the contaminated water droplets are deposited on the walls of the annular conduit 19 and are allowed to flow down towards a secondary collection sump or tank 25b. A secondary drain line 22 is provided at the secondary collection sump 25b to drain the contaminated or scrubbed water. The drained scrubbed water may be channelled to a water treatment system (not shown).

A demister 26 is disposed prior to the outlet 20 of the scrubber apparatus 100 to remove entrained wash liquid mist in the polished gas before discharging through the outlet 20.

Figure 6:
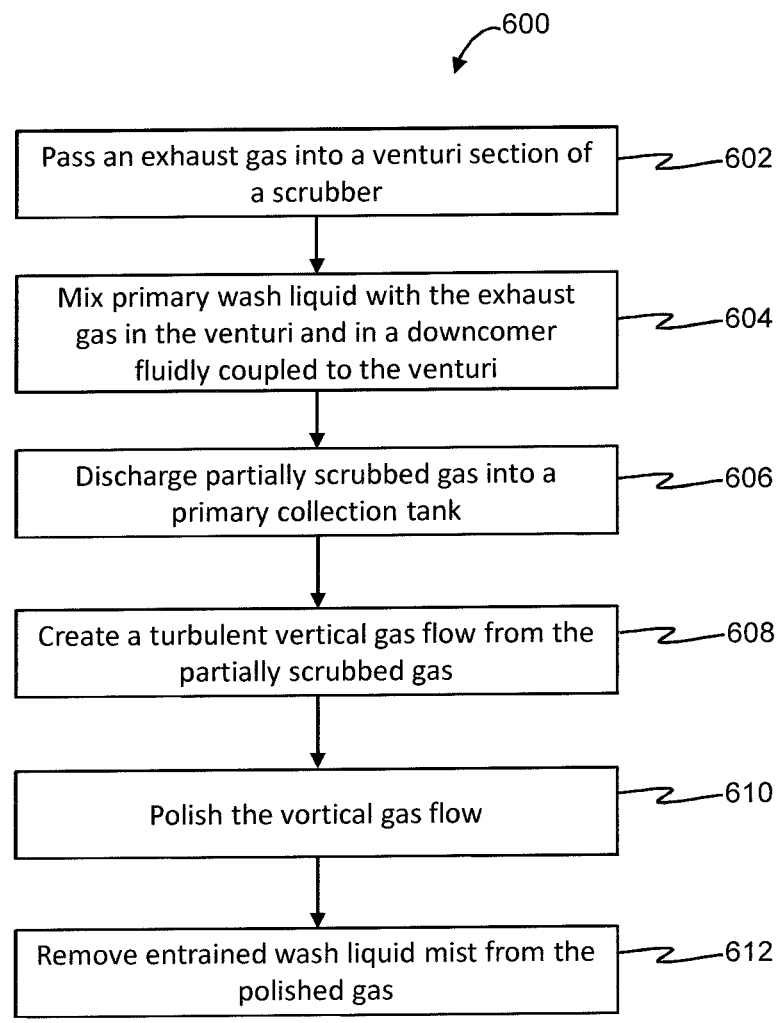
FIG. 6 shows a method for scrubbing exhaust gas according to one embodiment of the invention.

A method of scrubbing a particulate laden exhaust gas with the scrubber apparatus 100 as described above is provided below with reference to FIG. 6. The method 600 includes passing an incoming particulate laden exhaust gas downwardly into a venturi 16 or funnel section (block 602). The exhaust gas is mixed with a primary wash liquid in the venturi section 16. The downward flow of the wetted gas is continued through an elongate and downwardly extending tube (downcomer) 6 where the gas is further allowed to be mixed and absorbed with wash liquid mist (block 604). A partially scrubbed gas is discharged from the downcomer 6 into a primary collection tank 25a (block 606). A turbulent vortical gas flow is created or generated from the partially scrubbed gas (block 608). Particularly, the discharged partially scrubbed gas is caused to reverse its flow direction by forcibly drawing the gas through a plurality of secondary mixing throats 9 which are disposed at an angle to the vertical direction. More particularly, a secondary wash liquid is injected at high pressure into each secondary mixing throat 9, causing the partially scrubbed gas to be drawn into the secondary mixing throat 9 to be mixed with the wash liquid. The partially scrubbed gas is then discharged from the secondary mixing throat 9 as a vortical flow which is at an angle to the vertical direction. The vortical gas flow is fed into a polishing section and polished in one or more stages to remove residual pollutants therefrom (block 610). The polished gas is passed through a demister 26 to remove entrained wash liquid mist therefrom (block 612) and thereafter discharged through the outlet 20 of the scrubber apparatus 100.

As would be apparent from the foregoing, the scrubber apparatus of the present disclosure provides a primary 5 and secondary mixing zone 12. In the primary mixing zone 5, a venturi section 16 and downcomer 6 are provided to provide large contact surface, adequate retention and turbulence to improve the absorption of exhaust gas into wash liquid. In the secondary mixing zone 12, further turbulence is provided to further improve absorption of partially scrubbed gas into the wash liquid. At the same time, the pressure loss of gas within the scrubber is minimised due to the pulling effect of high pressure wash liquid on the lower-pressured gas. The secondary mixing zone 12 results in the discharge of vortical gas flow into a polishing section. This vortical nature allows the gas to be retained in the polishing section for an extended travelling path compared to a non-vortical gas flow, thereby increasing the contact of the gas with the polishing spray which necessarily results in greater cleaning efficacy.

In the present disclosure, the wash liquid includes but is not limited to sea water, fresh water, a mixture of fresh water and sea water with alkaline additives.

The direction of flow of exhaust gas through the venturi section 16 is preferably vertically downwards so that the incoming exhaust gas experiences an increase in contact surface with the wash liquid spray from the first primary spray header.

The total inner volume of the downcomer 6 is filled with turbulent wash liquid mist due to the use of high pressure spray headers in the second primary spray header. The pressure required by this spray header may vary from 1 bar to 12 bar, preferably 8 bar.

The scrubber apparatus may be operated as open loop scrubbing configuration including two operating modes: 1) a single pass mode or a 2) double pass mode.

In a single pass mode, all wash liquids used in the venturi section 16, distribution section and polishing section are fresh sea water, or fresh water, or a mixture of fresh water and sea water with alkaline additives. All spray headers (2, 3, 11 and 17) receive wash liquid from the same external source, and the spent liquid is drained from sump 25a and 25b to a downstream water treatment unit (not shown).

Figure 4:
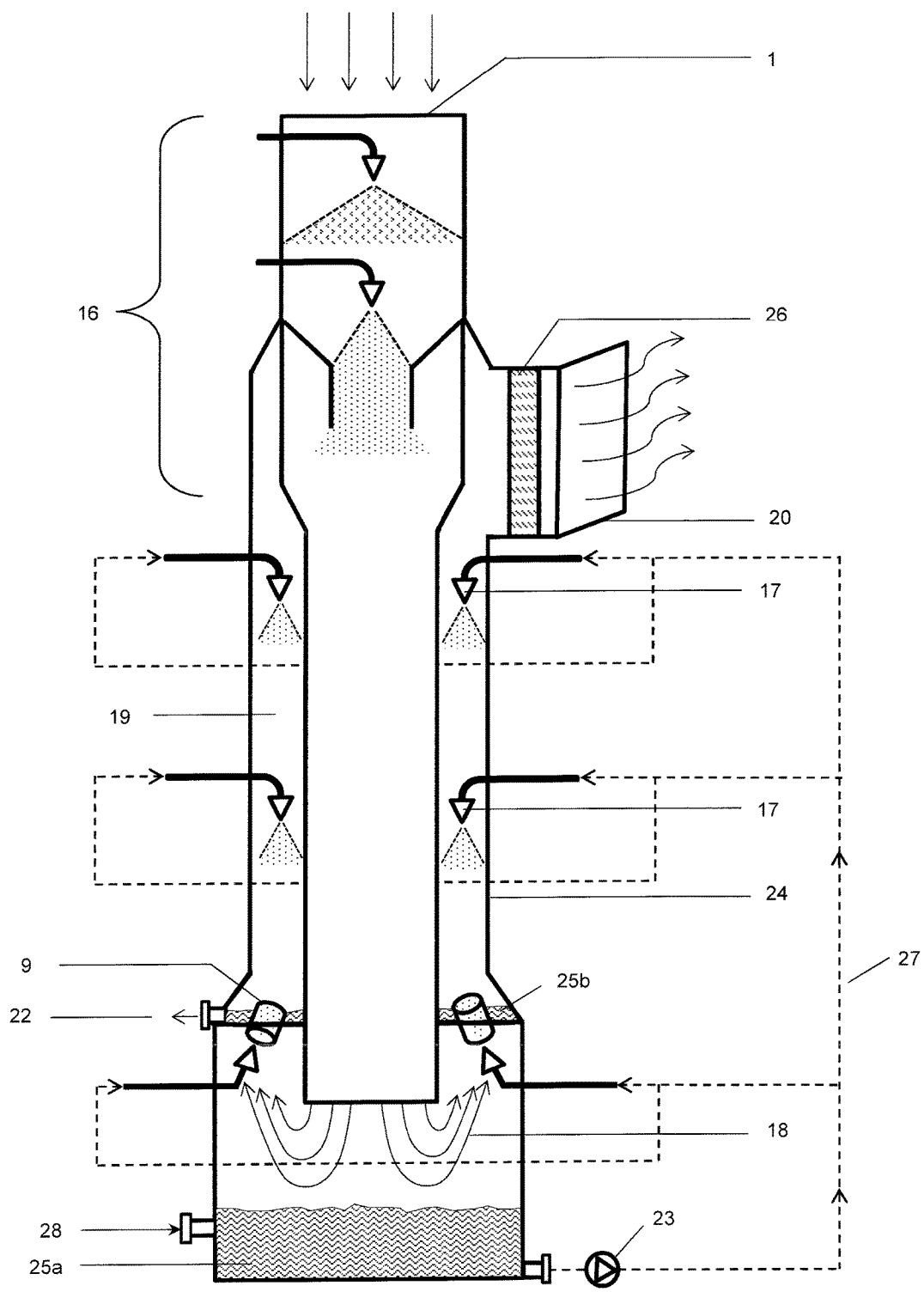
FIG. 4 is a flow diagram according to the scrubbing apparatus of FIG. 1 in a recirculation mode, wherein an alkaline substance is dosed to enhance the adsorption capacity of wash liquid.

Shown in FIG. 4, in the double pass mode, only venturi section 16 receives all wash liquid externally. After the wash liquid is used in venturi section 16, it is received in the collection tank 25a. This collected water having a pH of around 3.0 is added with an alkaline additive such as sodium hydroxide, magnesium oxide, magnesium hydroxide through dosing inlet 28 to increase pH or recover the alkalinity back up to the original level of feed wash liquids. The recovered (pH-increased) wash liquid from collection tank 25a is again transferred, by pump 23, through a recycle line 27 to the secondary mixing throat 9 and the polishing stage 17. The recycled wash liquid will subsequently be received in the secondary sump 25b, where it is drained from secondary drainage 22 to a downstream water treatment unit (not shown). In the double pass system, the volume of total wash liquid required will be reduced by nearly half as compared to the single pass system.

The total geometry of the device including all parts may be circular, rectangular or in any other geometrical shapes which is customised to fit the space available and wash liquid stream flow characteristics.

Figure 5:
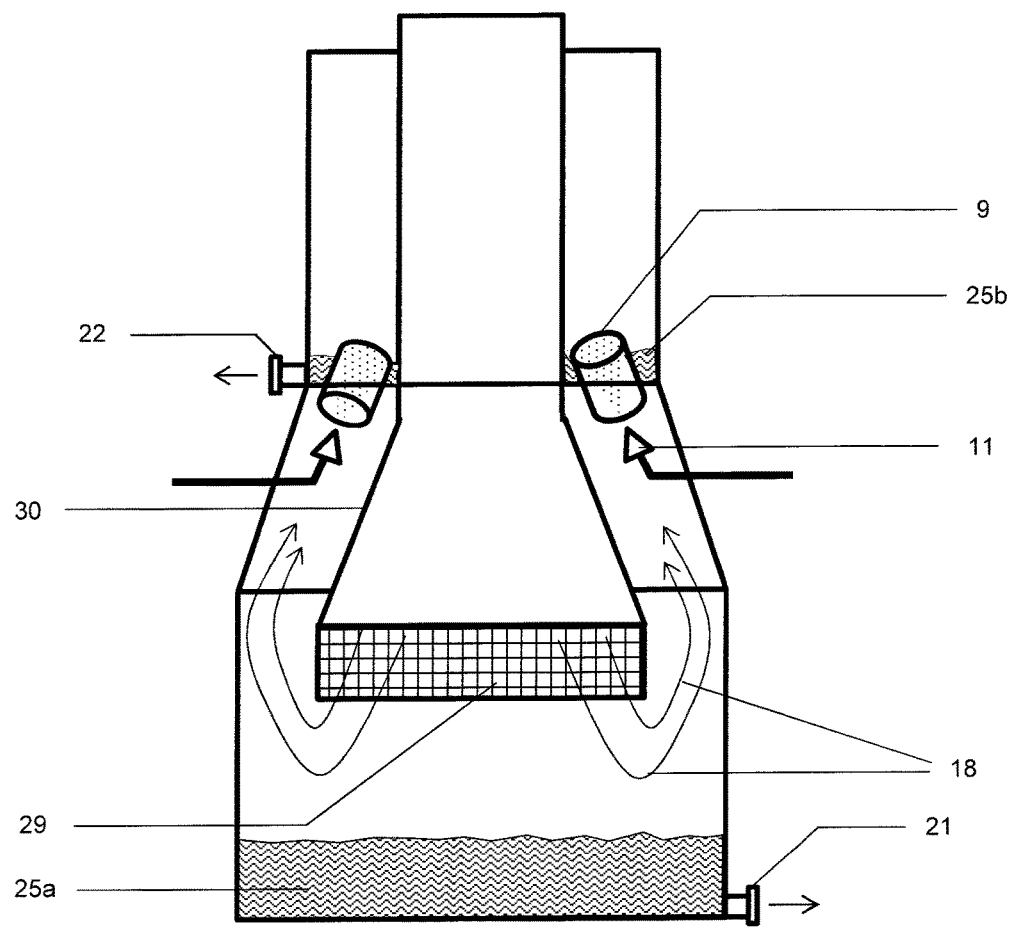
FIG. 5 is a partial view of a scrubber apparatus having a tapered conduit and packing section coupled in fluid communication with the downcomer according to another embodiment of the invention.

According to another embodiment of the invention, the downcomer 6 includes a packing section 29 and a tapered conduit 30. FIG. 5 is a partial view of a scrubber apparatus according to another embodiment of the invention. In FIG. 5, a tapered conduit 30 has a narrow end and a distal wide end. The narrow end is fluidly coupled to the exit of the downcomer 6 while the wide end is fluidly coupled to the packing section 29. This tapered conduit arrangement forces a reduction in the gas velocity as the gas discharged from the downcomer 6 flows towards the packing section 29. This reduced gas velocity allows the gas entering the packing section 29 to be retained longer in the packing section 29. The packing section 29 may be provided with random or structured packing material for pollutant removal. A collection tank 25a is provided to retain the wash liquid and gas discharged from the packing section 29 for further processing. This discharged gas from the packing section 29 is then drawn through the distribution plate assembly (9, 11 and 13) for secondary mixing and subsequently discharged to be polished by the polishing headers 17 as described in the foregoing paragraphs.

The scrubber apparatus according to this embodiment illustrated in FIG. 5 includes other components, e.g. venturi, distribution assembly, polishing section, and demister are similar to the scrubber apparatus as described with reference to FIGS. 1 to 4.

The embodiment illustrated in FIG. 5 may be optionally modified to omit the tapered conduit 30. Accordingly, the exit of the downcomer is fluidly coupled to a packing section directly.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary.

The invention claimed is:

1. A scrubber apparatus comprising:
 a venturi section to receive an exhaust gas;
 at least a primary spray header to inject a primary wash liquid into the venturi section;
 a downcomer disposed downstream of the venturi section and fluidly coupled to the constriction of the venturi;
 a primary collection tank disposed downstream of the downcomer to retain the primary wash liquid and a partially scrubbed gas discharged from the downcomer;
 a plurality of secondary mixing throats arranged at an inclination to the vertical direction, each of the secondary mixing throats is provided with a secondary spray header adapted to inject into the each secondary mixing throat a high pressure secondary wash liquid which is to cause the partially scrubbed gas to be drawn into the each secondary mixing throat to mix with the secondary wash liquid, wherein the resulting gas is to be discharged from the each secondary mixing throat as a vortical gas flow which is to be fed into a polishing section having a plurality of polishing spray headers to polish the vortical gas flow; and
 a demister disposed to remove entrained wash liquid mist from a polished gas discharged from the polishing section.

2. The scrubber apparatus of claim 1, wherein the downcomer includes
 a tapered conduit having a narrow end and a distal wide end, the narrow end being fluidly coupled to the exit of the downcomer, and
 a packing section fluidly coupled to the wide end of the tapered conduit, wherein the partially scrubbed gas to be discharged from the downcomer is to pass through the conduit and the packing section.

3. The scrubber apparatus of claim 1, wherein the downcomer includes a packing section fluidly coupled thereto, wherein the partially scrubbed gas to be discharged from the downcomer is to pass through the packing section.

4. The scrubber apparatus of claim 1, wherein the secondary mixing throats are mounted on a distribution plate which is disposed to separate the polishing section from the primary collection tank.

5. The scrubber apparatus of claim 1, further comprising a secondary collection tank disposed to receive liquid discharged from the polishing section.

6. The scrubber apparatus of claim 1, wherein the primary collection tank is fluidly coupled to each secondary spray header and the polishing spray headers.

7. A method of scrubbing exhaust gas, the method comprising:
 passing an exhaust gas into a venturi section;
 mixing a primary wash liquid with the exhaust gas in the venturi section and in a downcomer which is fluidly coupled thereto;
 discharging a partially scrubbed gas from the downcomer into a primary collection tank;
 creating a vortical gas flow from the partially scrubbed gas by injecting a high pressure secondary wash liquid through a plurality of secondary mixing throats, which are arranged at an inclination to the vertical direction, to forcibly draw the partially scrubbed gas from the primary collection tank into a polishing section;
 polishing the vortical gas flow to remove residual pollutants therefrom; and removing entrained wash liquid mist from the polished gas.

8. The method of claim 7, wherein discharging a partially scrubbed gas from the downcomer into a primary collection tank further includes passing the partially scrubbed gas through a tapered conduit and a packing section.

9. The method of claim 7, wherein discharging a partially scrubbed gas from the downcomer into a primary collection tank further includes passing the partially scrubbed gas through a packing section.

10. The method of claim 7, further comprising:
increasing pH of a discharged liquid collected in the primary collection tank; and
transferring the pH-increased liquid to be injected through the each secondary mixing throat.

11. The method of claim 10, wherein polishing the vortical gas flow includes polishing the vortical gas flow with the pH-increased liquid.

\* \* \* \* \*